(12) United States Patent
Rao et al.

(10) Patent No.: US 11,875,246 B2
(45) Date of Patent: Jan. 16, 2024

(54) INTELLIGENT FODAS SYSTEM AND METHOD BASED ON AI CHIP

(71) Applicant: Sichuan Guangsheng IOT Technology Co., Ltd., Chengdu High-tech Zone (CN)

(72) Inventors: Yunjiang Rao, Chengdu High-tech Zone (CN); Bing Han, Chengdu High-tech Zone (CN); Jingfeng Long, Chengdu High-tech Zone (CN)

(73) Assignee: SICHUAN GUANGSHENG IOT TECHNOLOGY CO., LTD., Chengdu High-Tech Zone (CN)

( * ) Notice: Subject to any disclaimer, the term of this patent is extended or adjusted under 35 U.S.C. 154(b) by 991 days.

(21) Appl. No.: 16/706,034

(22) Filed: Dec. 6, 2019

(65) Prior Publication Data
US 2021/0064972 A1    Mar. 4, 2021

(51) Int. Cl.
*G06N 3/06*    (2006.01)
*G06N 3/08*    (2023.01)
(Continued)

(52) U.S. Cl.
CPC .............. *G06N 3/06* (2013.01); *G01H 9/004* (2013.01); *G06F 9/3877* (2013.01); *G06N 3/08* (2013.01)

(58) Field of Classification Search
CPC .......... G01H 9/004; G01H 9/006; G06N 3/08; G06N 20/00; G01V 1/226; G01N 2201/0886
See application file for complete search history.

(56) References Cited

U.S. PATENT DOCUMENTS

2014/0152995 A1\* 6/2014 Dong ................. G01D 5/35316
356/477
2017/0176221 A1\* 6/2017 Hartog ............... G01D 5/35361
(Continued)

OTHER PUBLICATIONS

Hongduo Zhao, "Assessment of concrete pavement support conditions using distributed optical vibration sensing fiber and a neural network", May 7, 2019 (Year: 2019).\*

*Primary Examiner* — Maurice C Smith
(74) *Attorney, Agent, or Firm* — Getech Law LLC; Jun Ye

(57) ABSTRACT

The present invention relates to an intelligent fiber optical distributed acoustic sensing (FODAS) system and method based on an artificial intelligence (AI) chip, belonging to the field of distributed optical fiber sensing technologies. The system comprises a light source, a modulator, an optical amplifier, a sensing part, a data processor, a photoelectric detector, and an alarm unit, where the data processor is specifically an AI chip; the light source, the modulator, the optical amplifier and port a of a circulator are connected in sequence, port b of the circulator is connected to an optical fiber, port c of the circulator is connected to the photoelectric detector, an output end of a detector is connected to the data processor, an output end of the data processor is connected to the alarm unit; and the data processor receives external acoustic signals and extracts amplitude and frequency features of the external acoustic signals to identify the type. The present invention can collect the external acoustic signals and identify the signal type thereof, and has important application value in the fields of perimeter security, disaster warning, geological exploration, and the like.

9 Claims, 2 Drawing Sheets

(51) Int. Cl.
　　　*G06F 9/38*　　　(2018.01)
　　　*G01H 9/00*　　　(2006.01)

(56) References Cited

U.S. PATENT DOCUMENTS

2018/0349508 A1\* 12/2018 Bequet .................... H04L 69/40
2019/0236477 A1\* 8/2019 Huang ................. G08G 1/0116
2020/0003588 A1\* 1/2020 Huang ................... G06Q 50/30
2020/0191613 A1\* 6/2020 Englund ............ G08B 13/1672

\* cited by examiner

INTELLIGENT FODAS SYSTEM AND METHOD BASED ON AI CHIP

TECHNICAL FIELD

The present invention relates to the field of distributed optical fiber sensing technologies, and in particular to an intelligent FODAS system and method based on an AI chip.

BACKGROUND

The FODAS system has been widely used in oil and gas exploration and other fields. When the external sound field changes, the phase difference between two adjacent points of detecting pulse light along optical fiber changes, which is proportional to the frequency and amplitude of the external sound field, thus the external sound field can be positioned and restored by demodulating the phase difference of Rayleigh backscattering signals between the two adjacent points. The FODAS technology can be used in the fields of perimeter security, disaster warning, geological exploration, and the like with high precision and sensitivity.

However, as a distributed sensing technology, every point of the sensing fiber in the FODAS system can be seen as a sensor, and the amount of the acquired sensing data is very large. Limited by the operating speed of existing central processing unit (CPU), it is difficult to perform real-time monitoring in the form of ultra-high precision, long-distance, multi-channel and large-scale network measurement. At the same time, currently, the combination of AI technology and FODAS technology is applied in the process of geological structure exploration and pipeline security and the like, while the pattern recognition of collected weak signals is not accurate and fast enough.

The AI algorithm performs model training through collecting a large amount of data, and requires hardware to cooperate in performing calculations, which places high demands on the computing power of processors. A conventional chip only needs to call a corresponding system to operate according to instructions, while an AI algorithm instruction contains a large amount of parallel computing and modeling, and the iteration can be repeated quickly as long as the calculation speed is fast. Therefore, existing ordinary CPU is insufficient to meet the practical application requirements.

SUMMARY

The objective of this present invention is to overcome the deficiencies that conventional FODAS system cannot perform pattern recognition over the detected weak signals, and to provide an intelligent FODAS system and method based on an AI chip.

The objective of the present invention is implemented through the following technical solution: an intelligent FODAS system based on an AI chip, comprising a light source, a modulator, an optical amplifier, a sensing part, a data processor, a photoelectric detector, and an alarm unit, wherein the data processor is specifically an AI chip, and the sensing part comprises a circulator and sensing fiber.

Specifically, an output end of the light source is connected to the modulator, an output end of the modulator is connected to the optical amplifier, an output end of the optical amplifier is connected to port a of the circulator, port b of the circulator is connected to the sensing fiber, port c of the circulator is connected to the photoelectric detector, an output end of a detector is connected to the data processor, and an output end of the data processor is connected to the alarm unit; and the data processor receives external acoustic signals and extracts amplitude and frequency features to identify the type.

Specifically, the AI chip is implemented based on a GPU, FPGA or ASIC architecture.

Specifically, the sensing fiber adopts standard single-mode fiber, few-mode fiber, acoustic sensitive fiber, or microstructured fiber.

Specifically, the sensing fiber has a length of at least 0.1 km, a spatial resolution of the sensing system is no greater than 10 m, and the sampling rate is at least 50 MSa/s.

Specifically, the system further comprises a driver and a data acquisition unit, wherein an output end of the driver is connected to the modulator and the data acquisition unit to drive the modulator and the data acquisition unit to operate; an output end of the photoelectric detector is connected to the data acquisition unit, and an output end of the data acquisition unit is connected to the AI chip.

Specifically, the optical amplifier is an EDFA and configured to amplify an optical signal; the light source is specifically a high-coherence narrow-linewidth laser with good frequency stability, ultra-long coherence length and ultra-low noise level; and a detector is specifically a high-sensitivity photo-detector capable of detecting weak acoustic signal.

Specifically, the alarm unit includes a first level alarm module, a second level alarm module and a third level alarm module, and is configured to perform grading alarm according to the external acoustic signal type.

The present invention further includes a method for an intelligent FODAS system based on an AI chip, where the method includes:
  carrying out, by a data processor, learning training on a large number of known acoustic sensing signals input in advance, and extracting the standard amplitude and frequency feature information of the known acoustic sensing signals by a data processor;
  receiving external acoustic signals, and demodulating phase difference between two adjacent external acoustic signals to extract amplitude and frequency feature information; and
  calculating a cost function of the standard amplitude and frequency features and the tested amplitude and frequency features to determine signal type of the external acoustic signals.

Specifically, the extracting standard amplitude and frequency feature information of the known acoustic sensing signals specifically comprises:
  multiplying a large number of input known acoustic sensing signal neurons by corresponding weights to further calculate a weighted sum of a plurality of multiply and add results; and
  using the weighted sum to calculate an activation function to obtain a neuron result, and extracting standard amplitude and frequency feature information of the known acoustic sensing signals.

Specifically, the signal types include, but are not limited to, a perturbation signal, an intrusion signal and a natural disaster signal.

Compared with the prior art, the present invention has the following beneficial effects:

(1) An intelligent FODAS system based on an AI chip provided by the present invention solves the problem that the computing speed of the ordinary CPU is relatively slow. Using the AI chip, the massive detected acoustic signals could be processed rapidly and in real-time, thereby meeting the practical needs of large-scale and high-precision distributed sensing in oil and gas exploration, geological structure monitoring, pipeline security, and optical fiber distributed hydrophones and the like.

(2) According to the intelligent FODAS system based on an AI chip provided by the present invention, the sensing fiber includes, but is not limited to, standard single-mode fiber, few-mode fiber, acoustic-sensitive fiber, microstructured fiber, or the like. With the help of these special sensing fiber, the signal-to-noise ratio, strain resolution and acoustic sensitivity of the FODAS system could be improved.

(3) According to a method for an intelligent FODAS system based on an AI chip provided by the present invention, the AI chip executes AI algorithms to perform training on different sensing signals, or through automatic update the algorithm model, real-time extraction and classification of signal features can be achieved to perform pattern recognition. It has an important application value in the aspect of intelligence in the fields of pipeline security warning, geological structure exploration, natural disaster prediction, and the like.

BRIEF DESCRIPTION OF DRAWINGS

The specific embodiments of the present invention will be further described in detail below with reference to the accompanying drawings. The accompanying drawings described herein are intended to provide a further understanding of the present application, which constitutes a part of the present application. The same reference numbers are used in these accompanying drawings to represent the same or similar parts. The illustrative embodiments of the present application and the description thereof are intended to explain the present application and do not constitute an undue limitation of the present application. In the figures.

Figure 1:
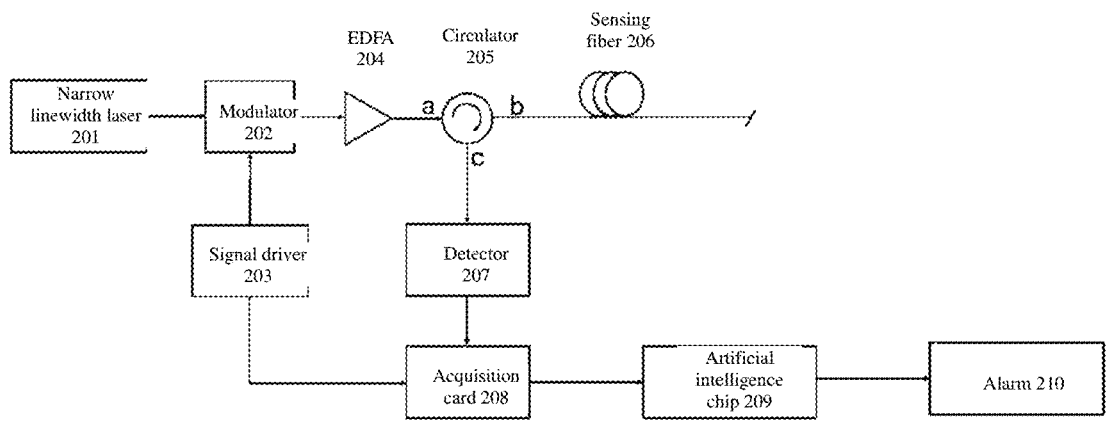
FIG. 1 is a system block diagram of Embodiment 1 of the present invention.

In the figures: narrow linewidth laser 201, modulator 202, signal driver 203, EDFA 204, circulator 205, sensing fiber 206, detector 207, acquisition card 208, AI chip 209, alarm unit 210.

DESCRIPTION OF EMBODIMENTS

The technical solutions of the present invention are clearly and completely described below with reference to the accompanying drawings. It is obvious that the described embodiments are some embodiments of the present invention rather than all of the embodiments. All other embodiments obtained by a person of ordinary skill in the art based on the embodiments of the present invention without creative efforts shall fall within the protection scope of the present invention.

In the description of the present invention, it should be noted that, direction or position relationships indicated by the terms "center", "upper", "lower", "left", "right", "vertical", "horizontal", "inner", "outer", and the like are based on the direction or position relationships in the accompanying drawings, only for facilitating the description of the present invention and simplifying the description, rather than indicating or implying that the indicated device or element must have a particular orientation or be constructed and operated in a particular orientation. Therefore, these terms should not be understood as a limitation to the present application. Moreover, the terms "first" and "second" are used for descriptive purposes only and are not to be construed as indicating or implying relative importance.

In the description of the present invention, it should be noted that, unless otherwise specified and defined, the terms "install", "connected with", "connected to" should be comprehended in a broad sense. For example, these terms may be comprehended as being fixedly connected, connected in a detachable way or integrally connected; mechanically connected or electrically connected; or directly connected or indirectly connected through an intermediate medium, or in an internal communication between two elements. The specific meanings about the foregoing terms in the present invention may be understood by those of ordinary skills in the art according to specific circumstances.

Furthermore, the technical features involved in the different embodiments of the present invention described below may be combined with each other as long as the embodiments do not constitute a conflict with each other.

Embodiment 1

This embodiment provides an intelligent FODAS system based on an AI chip. As shown in FIG. 1, the system specifically comprises a light source, a modulator, an optical amplifier, a driver, a sensing part, a data acquisition unit, a data processor, a photoelectric detector, and an alarm unit 210.

In this embodiment, the data processor is specifically an AI chip 209, and the sensing part comprises a circulator 205 and sensing fiber 206; the circulator 205 is configured to ensure the unidirectional transmission direction of the light source, a signal optical amplifier is specifically an EDFA, the modulator is specifically a modulator 202, the driver is specifically a signal driver 203, and the data acquisition unit is specifically an acquisition card 208.

Furthermore, an output end of the light source is connected to the modulator, an output end of the driver is connected to the modulator and the data acquisition unit, an output end of the modulator is connected to the optical amplifier, an output end of the optical amplifier is connected to port 205*a* of the circulator, port 205*b* of the circulator is connected to the sensing fiber 206, port 205*c* of the circulator is connected to the photoelectric detector, an output end of a detector is connected to the data processor, and an output end of the data processor is connected to the alarm unit 210; and the data processor receives detected acoustic signals, extracts the amplitude and frequency features to identify the signal type, and controls the alarm unit to perform grading alarm.

Further, the AI chip in the present invention includes a universal AI chip or an AI chip dedicated to FODAS. A conventional CPU processor has a lot of other logic internally, thus the operation speed is relatively slow, the storage depth is not enough, the power consumption is large, and it is difficult to process massive data in real time. To meet the calculation requirements, in the present invention, the AI chip is used to perform real-time parallel processing of a large amount of sensing data, and the data computing speed is accelerated.

Furthermore, the AI chip can be implemented based on GPU, FPGA or ASIC architecture. Most voice identification and image processing algorithms are combined with the universal AI chip. The present invention has the difference that the algorithm can be combined with customized chips such as FPGA or ASIC. The computing ability and efficiency of the AI chip are directly customized according to the needs of the algorithm to achieve pipeline parallelism and data parallelism. Compared with the universal AI chip, the customized AI chip has smaller size, lower power consumption, lower delay, higher reliability, higher confidentiality, higher computing performance, higher computational efficiency, and the like.

The dedicated AI chip in the present invention is a field-programmable gate array (FPGA) or an application-specific integrated circuit (ASIC) chip for accelerating the execution of an AI algorithm. Compared with the universal chip, the FPGA with a built-in digital signal processing module and a local memory is more energy-efficient. In addition, the ASIC chip is a dedicated and customized designed and manufactured according to the requirements of specific users. Except that the ASIC chip cannot be extended, it is small in size, consuming less power, and making a device have independent inference computing power without networking. The computing speed of the AI chip can reach 90 Tops, which is 15-30 times faster than that of an ordinary CPU processor, and 20 times less total energy consumption is achieved. It flexibly supports training and prediction and can efficiently meet the training and inference requirements simultaneously. The AI chip in the present invention comprises a complete set of control systems, the core of which is an arithmetic unit array formed by a combination of multiply add accumulator: a multiplication matrix. About 50% area in the AI chip is allocated to an on-chip memory for saving input data of a multiplication matrix and the multiplication matrix. The optically-electrically converted digital acoustic signals obtained by the sensing fiber 206 are transmitted to an input buffer through a data storage unit using a PCIE bus, and the first in first out (FIFO) is configured to store weight values in the algorithm.

Further, the present invention not only performs simple positioning, but also extracts the amplitude and frequency features of the external acoustic signals, and can reduce noise intensity to improve system signal-to-noise ratio and strain resolution while demodulating the external acoustic signals. In addition, the AI chip performs training on the received sensing signals through the AI algorithm to implement the real-time processing and signal type identification.

Further, the sensing fiber 206 includes, but is not limited to, standard single-mode fiber, few-mode fiber, acoustic sensitive fiber, microstructured fiber, or the like. The length of the sensing fiber 206 is at least 0.1 km, the spatial resolution is no greater than 10 m, and the sampling rate is at least 50 MSa/s. With the help of the special sensing fiber 206, the signal-to-noise ratio, strain resolution and acoustic sensitivity of the FODAS system can be improved.

Further, the alarm unit 210 includes a first level alarm module, a second level alarm module and a third level alarm module. As an option, the system is applied to natural disaster signal monitoring. When the AI chip 209 determines that the external acoustic signal is an intrusion signal, the first level alarm module makes an alarm, and the first level alarm module is specifically an LED lamp and a first buzzer; more specifically, when the AI chip 209 determines that the external acoustic signal is a light natural disaster signal, the second level alarm module makes an alarm, and the second level alarm module is specifically an LED lamp and a second buzzer; the second buzzer makes an alarm through a first power optical amplifier circuit, and the buzz of the second buzzer is louder than that of the first level alarm module; when the AI chip 209 determines that the external acoustic signal is a moderate-severe natural disaster signal, the third level alarm module makes an alarm, and the third level alarm module is specifically an LED lamp and a third buzzer; the third buzzer makes an alarm through a second power optical amplifier circuit, and the buzz of the third buzzer is louder than that of the second level alarm module. Similarly, the system is also applicable to oil and gas exploration, geological exploration, border security, pipeline monitoring and other fields. For example, when the system is applied to the pipeline monitoring, the combination of the AI chip 209 and the sensing fiber 206 can solve the problems of real-time positioning difficulty, low demodulation calculation accuracy and low speed caused by long sensing distance and the large data size of signal data.

Further, the narrow linewidth laser 201 outputs light as a source, and the signal driver 203 drives the modulator 202 to modulate continuous light input into pulse light. Since the pulse light power is low, it needs to be amplified by the EDFA and then is used as detecting pulse light of the system. The detecting pulse light is input from port a of the circulator 205 and injected into the sensing fiber 206 through port b of the circulator 205; the detecting pulse light generates Rayleigh backscattering light in the sensing fiber 206, the generated Rayleigh backscattering light is transmitted to a detector 207 through port c of the circulator 205, the detector 207 converts the received optical signal into electrical signal, and the signal driver 203 drives the acquisition card 208 to acquire received signal. The AI chip performs subsequent data processing, locates the external sound field according to the time sequence of the returned signal, demodulates phase difference between two adjacent points along the sensing fiber 206 to extract the amplitude and frequency features. Then the AI chip realizes signal type identification according to the amplitude frequency features of the external acoustic signals, and controls the alarm unit 210 to perform grading alarm.

Embodiment 2

Figure 2:
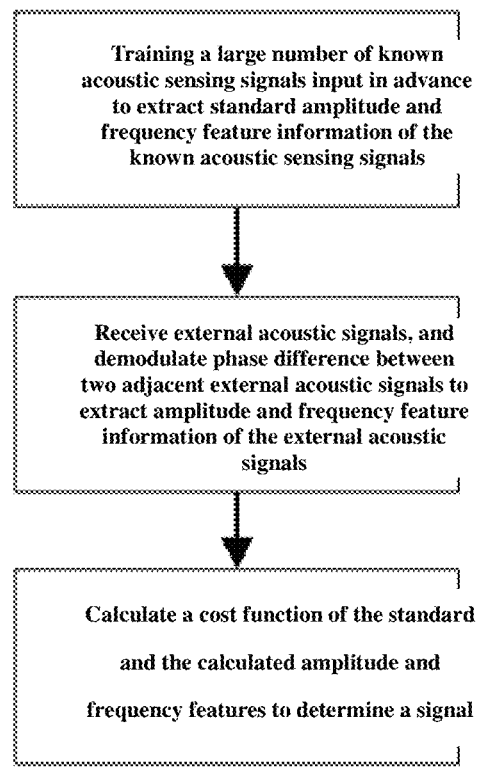
FIG. 2 is a flow chart of a method according to Embodiment 2 of the present invention.

This embodiment has the same inventive concept as Embodiment 1 and provides a method for signal classification of an intelligent FODAS system based on an AI chip. As shown in FIG. 2 based on Embodiment 1, the method specifically includes:

Step S01: establish a signal type database based on known acoustic signals; that is, training the data set of a large number of known acoustic sensing signals input in advance by data processor, extract standard amplitude and frequency features of the known acoustic sensing signals, and establish a signal type database according to the standard amplitude and frequency feature information, where the signal type database records the range of amplitude and frequency feature values corresponding to various acoustic signal types. The signal types include, but are not limited to, an intrusion signal and a natural disaster signal.

Step S02: extract amplitude and frequency features of external acoustic signals; specifically, the data processor demodulates phase difference between the detected acoustic signals of two adjacent points, and calculate the amplitude and frequency of the phase difference of a disturbance point, namely amplitude and frequency of the external acoustic signals, to extract amplitude and frequency features of the external acoustic signals.

Step S03: calculate a cost function of the standard and the calculated amplitude and frequency features to determine the signal type of the external acoustic signals.

Figure 3:
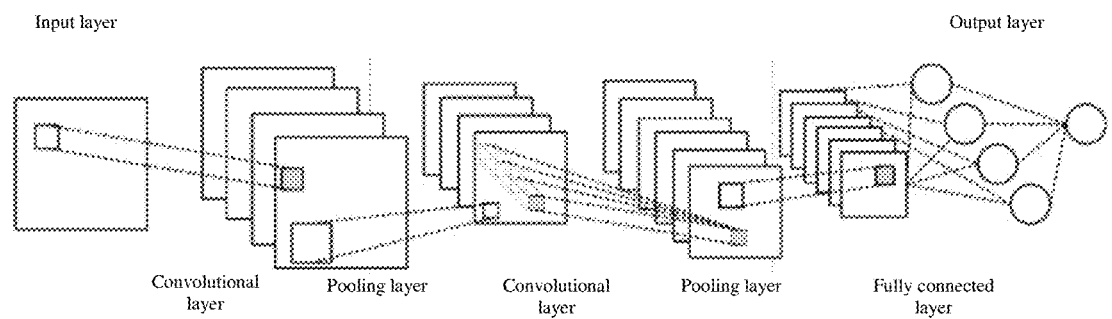
FIG. 3 is a network model block diagram of Embodiment 2 of the present invention.

Further, the extracting standard amplitude frequency feature information of the known acoustic sensing signals in the step S01 specifically includes: training a large number of known acoustic sensing signals input in advance, optimizing the weight values of a neural network model, and obtaining a neuron output result of the neural network model; that is, multiplying a large number of input known acoustic sensing signal neurons by corresponding weights to further calculate a weighted sum of a plurality of multiply and add results; and using the weighted sum to calculate an activation function to obtain a neuron result to extract standard amplitude frequency feature information of the known acoustic sensing signals; where the AI algorithm is used to perform feature extraction and training on a large number of known sensing signals input in advance. More specifically, as shown in FIG. 3, a neural network for training on a data set of a large number of known acoustic sensing signal input in advance includes a convolutional layer, a pooling layer, a fully connected layer and an output layer. A specific process of carrying out learning training through the neural network is as follows: inputting training set data to an input layer of a convolutional neural network, and normalizing the data. The processed data is input into the convolutional layer, and the data is calculated using a randomly initialized convolution kernel. The calculated data is input to the pooling layer to downsample the data. The so-called pooling layer actually takes the average or maximum value of an area, retains the most significant features, and improves the distortion tolerance of the model. By repeating in this way, the neuron output result of the neural network model, namely the standard amplitude and frequency feature information of the known acoustic sensing signals, can be obtained, and the calculation formula is as follows:

$$C(w, b) = -\frac{1}{n}\sum_x [y\ln a + (1-y)\ln(1-a)]$$

where a is the neuron output result of the neural network model, y is a training set data label, W is a weight matrix, and b is an offset value.

Further, the calculating a cost function of the standard amplitude and frequency features and the calculated amplitude and frequency features in the step S03 specifically includes:

gradually approximating a minimum value of the cost function by a gradient descender to obtain optimal parameters of the convolutional neural network, namely standard amplitude and frequency feature information closest to the calculated amplitude and frequency features of the external acoustic signals, thereby determining external acoustic signal types. An equation for updating a weight in a gradient descent algorithm is as follows:

$$w_k \rightarrow w'_k = w_k - \eta\frac{\partial C}{\partial w_k}$$

$$b_l \rightarrow b'_l = b_l - \eta\frac{\partial C}{\partial b_l}$$

Where $\eta$ is the learning rate and C is a hyperparameter.

Further, the AI chip of the data processor can determine the position of the external acoustic signals according to receiving time. When the system is applied to border security and pipeline monitoring, the accident location can be quickly got.

This embodiment provides a storage medium on which computer instructions are stored, and the steps of the method for an intelligent FODAS system based on an AI chip in Embodiment 2 are executed when the computer instructions run.

Based on such understanding, a technical solution of this embodiment which is essential or a part contributing to the prior art or a part of the technical solution may be embodied in the form of a software product, the computer software product is stored in a storage medium, including a plurality of instructions for causing a computer device (which may be a personal computer, a server, or a network device) to perform all or some steps of the method of each embodiment of the present invention. The foregoing storage medium comprises: various media capable of storing program code, such as a USB flash disk, a mobile hard disk, a read-only memory (ROM), a random-access memory (RAM), a disk or an optical disc.

This embodiment further provides a terminal comprising a memory and a processor, where the memory stores computer instructions executable on the processor, and when the processor runs the computer instructions, the steps of the method for an intelligent FODAS system based on an AI chip in Embodiment 2 are executed. The processor may be a single-core or multi-core central processor or a specific integrated circuit, or one or more integrated circuits configured to implement the present invention.

Functional units in the embodiments provided by the present invention may be integrated into one processor, or each unit may exist physically separately, or two or more units may be integrated into one unit.

The foregoing specific embodiments are detailed descriptions of the present invention. It should not be understood that the specific embodiments of the present invention are only limited to these descriptions, and for those of ordinary skill in the art which the present invention pertains to, a plurality of simple deductions and substitutions can further be performed without departing from the concept of the present invention, and should be regarded as falling within the protection scope of the present invention.

The invention claimed is:

1. An intelligent fiber optical distributed acoustic sensing (FODAS) system based on an AI chip, comprising a light source, a modulator, an optical amplifier, a data processor, a photoelectric detector, an alarm unit, wherein the data processor is specifically an AI chip, and an optical fiber comprises a circulator and sensing fiber;

an output end of the light source is connected to the modulator, an output end of the modulator is connected to the optical amplifier, an output end of the optical amplifier is connected to port a of the circulator, port b of the circulator is connected to the sensing fiber, port c of the circulator is connected to the photoelectric detector, an output end of a detector is connected to the data processor, and an output end of the data processor is connected to the alarm unit; and the data processor receives external acoustic signals and extracts amplitude and frequency features of the signals to identify the type, wherein the alarm unit comprises a first level alarm module, a second level alarm module and a third level alarm module, and is configured to perform grading alarm according to the external acoustic signal type.

2. The intelligent FODAS system based on an AI chip according to claim 1, wherein the AI chip is implemented based on GPU, FPGA or ASIC architecture.

3. The intelligent FODAS system based on an AI chip according to claim 1, wherein the sensing fiber adopts standard single-mode fiber, few-mode fiber, acoustic sensitive fiber, or microstructured fiber.

4. The intelligent FODAS system based on an AI chip according to claim 3, wherein the sensing fiber has a length of at least 0.1 km, the spatial resolution of the sensing system is no greater than 10 m, and the sampling rate is at least 50 MSa/s.

5. The intelligent FODAS system based on an AI chip according to claim 1, further comprising a driver and a data acquisition unit, wherein an output end of the driver is connected to the modulator and the data acquisition unit to drive the modulator and the data acquisition unit to operate; an output end of the photoelectric detector is connected to the data acquisition unit, and an output end of the data acquisition unit is connected to the AI chip.

6. The intelligent FODAS system based on an AI chip according to claim 1, wherein the optical amplifier is specifically an erbium-doped optical fiber amplifier (EDFA), and the light source is specifically a high-coherence narrow-linewidth laser.

7. A method for an intelligent fiber optical distributed acoustic sensing (FODAS) system based on an AI chip, comprising:
  carrying out, by a data processor, learning training on a large number of known acoustic sensing signals input in advance, and extracting the standard amplitude and frequency feature information of the known acoustic sensing signals by a data processor;
  receiving external acoustic signals, and demodulating phase difference between two adjacent external acoustic signals to extract amplitude and frequency feature information; and
  calculating a cost function of the standard amplitude and frequency features and the tested amplitude and frequency features to determine signal type of the external acoustic signals.

8. The method for an intelligent FODAS system based on an AI chip according to claim 7, wherein the extracting standard amplitude and frequency feature information of the known acoustic sensing signals specifically comprises:
  multiplying a large number of input known acoustic sensing signal neurons by corresponding weights to further calculate a weighted sum of a plurality of multiply and add results; and
  using the weighted sum to calculate an activation function to obtain a neuron result, and extracting standard amplitude and frequency feature information of the known acoustic sensing signals.

9. The method for an intelligent FODAS system based on an AI chip according to claim 7, wherein the signal types comprise, but are not limited to, an intrusion signal and a natural disaster signal.

* * * * *